No. 703,585. Patented July 1, 1902.
J. VOM HOFE.
FISHING REEL.
(Application filed Dec. 4, 1901.)
(No Model.)
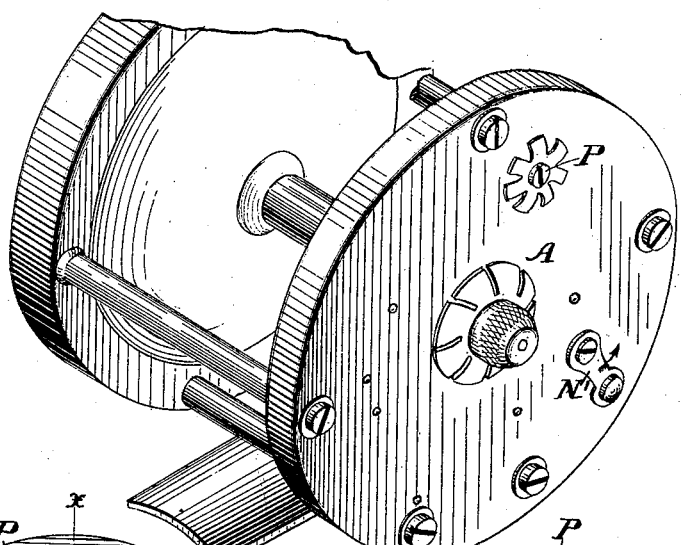
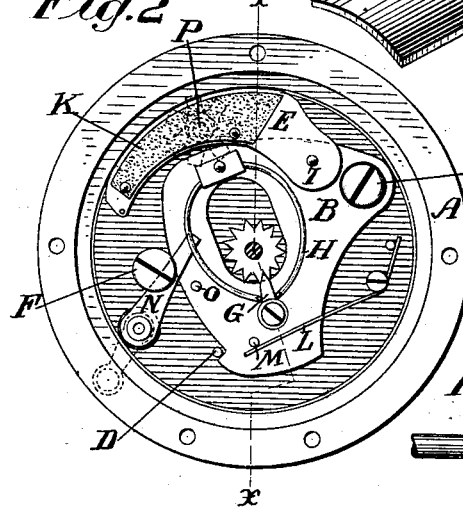
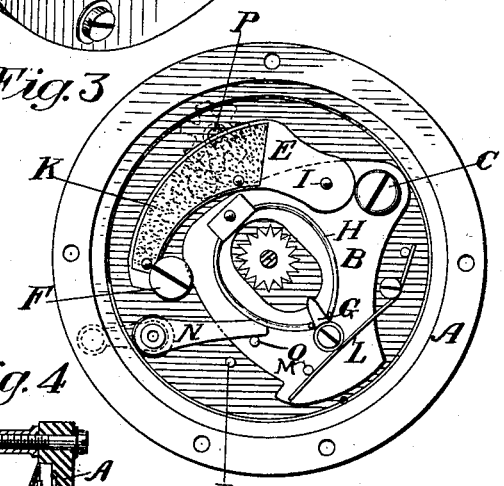
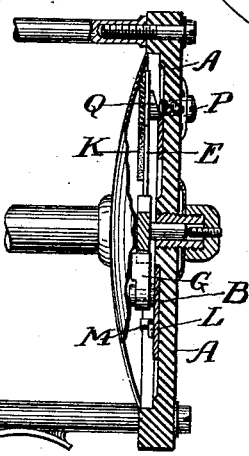
Witnesses
Geo. B. Rowley
F. M. Donsbach
Inventor
Julius Vom Hofe
By his Attorney

UNITED STATES PATENT OFFICE.

JULIUS VOM HOFE, OF BROOKLYN, NEW YORK.

FISHING-REEL.

SPECIFICATION forming part of Letters Patent No. 703,585, dated July 1, 1902.

Application filed December 4, 1901. Serial No. 84,681. (No model.)

*To all whom it may concern:*

Be it known that I, JULIUS VOM HOFE, a citizen of the United States, and a resident of Brooklyn, in the county of Kings and State of New York, have invented certain new and useful Improvements in Fishing-Reels, of which the following is a specification.

My invention is an improvement in fishing-reels; and it consists, broadly speaking, in providing a fishing-reel with a click and drag so combined that the click and drag can both be thrown simultaneously in or out of action by a single movement of the angler. The combination is also such that, if so desired, the click and drag may remain in operative position while the line is running out, but will be automatically thrown out of action while the line is reeled in.

The invention further consists in certain novel subcombinations of parts hereinafter set forth and claimed whereby the drag is automatically withdrawn or rendered inoperative in a peculiar manner when the line is reeled in.

In the drawings forming part of this specification, Figure 1 represents a perspective view of my reel, showing the exposed parts by which the angler throws the click and drag in and out of action and regulates the friction of the drag. Fig. 2 is a plan view of the click and drag mechanism in operative position. Fig. 3 is a similar view showing the click and drag withdrawn from operative position. Fig. 4 is a sectional view on the line $x\ x$ of Fig. 2, and Fig. 5 is a partial sectional view to show the stud which aids to retain the drag in inactive position when so desired.

A represents one side plate of my reel. B is the click-plate, and C is a pivot eccentric to the axis of the spool of the reel, upon which pivot the plate B swings in the plane of the reel side plate A and is thus movable edgewise. The amplitude of this motion of the click-plate B is governed in one direction by the stud D, as shown in Fig. 2; in the other direction, by the free end of the drag E coming into contact with the stud F, as shown in Fig. 3. The click-plate B carries the ordinary pawl G and pawl-spring H.

Attached at I to the click-plate B, as shown in Figs. 2 and 3, is the drag E. Its operative face is armed with leather K or any substance suitable for a friction-pad. It will be noticed that the click-plate B carries the drag E with it and that if the click-plate B is thrown into the position shown in Fig. 3 the drag E is carried with it and out of operation. The mode of operation of this portion of my device is as follows: The spring L, bearing on the stud M, always tends to throw the click-plate B into the position shown in Fig. 2, with the pad K of the drag in frictional contact with the customary concave outer end of the spool, when both click and drag are in operative position. The click-plate B and drag E are thrown out of operation (the position shown in Fig. 3) by the finger N in the following way: The finger N is operated by a handle on the outside of the reel, as shown at N' in Fig. 1 and in dotted lines in Figs. 2 and 3. When the finger N is moved to the position shown in Fig. 3, it strikes the stud O on the click-plate B and moves it into the position shown in Fig. 3, where both click and drag are out of operation and are so held by the frictional resistance of the finger N and by the free end of the drag E being brought under the taper-headed stud F. (See Fig. 3.) The reel then becomes a free-running reel. If the finger N is then moved to the position shown in Fig. 2, the click-plate is released, and the spring L throws the click and drag plates simultaneously into operative position.

My device has an additional function.

Assume the mechanism to be in the position shown in Fig. 2. Then the click and drag are in the position they assume when a fish is running out the line and resist its movement. Now assume that the angler begins to reel in his line. He leaves the finger N just as it was and simply actuates the handle of the reel in the proper direction to take in the line. The result is that the friction of the free end of the drag E against the concave outer side of the flange of the spool of the reel (upon which the drag bears when in operation) is such that it overcomes the resistance of the spring L, and the click and drag plates are both moved nearly enough into the position shown in Fig. 3 to release both click and drag and put them out of operation. As long as the angler winds in his line he thus experiences no resistance at all from the click and but a difficultly-perceptible resistance from the drag; but the moment he stops winding in the friction of the spool ceases and the spring L throws the click and drag into active position. Thus when the line is running out the resistance of both click and drag must be overcome. When the line is wound in, a hardly-perceptible resistance obtains, and these actions are purely automatic.

The mechanism hereinbefore described and shown in Figs. 2 and 3 is located between the reel side plate A and the adjacent flange of the spool of the reel. The resistance of the drag is obtained by the rubbing of the free end of the drag against the concave outer side of the flange of the spool in the usual way, and the automatic withdrawal of the drag, and therewith the click, when the line is reeled in is due to the frictional contact between the spool and the drag and the movement of said free end of the drag out of such frictional contact and toward the retracting-stud F due to the eccentric position of the pivot C with reference to the spool's axis and the concavity of the frictional surface of the spool. The friction, and consequently the resistance, of the drag may be regulated by the screw P without opening the reel. The screw bears upon a stud Q (best seen in Fig. 4) upon the under side of the drag E, so that upon turning said screw inward the pressure of the drag against the spool is increased, while upon withdrawing the said screw the pressure is relaxed.

Having thus described my invention, what I claim as new, and desire to secure by Letters Patent, is—

1. In a fishing-reel, the combination with the spool of a click-plate bearing a pawl and its spring and movable edgewise, a drag movable with said plate, means for moving said plate and therewith said pawl and said drag into effective position, and means for retracting the same; the whole being so organized that when and while the line is withdrawn from the spool both the pawl and the drag simultaneously oppose such withdrawal, whereas when and while the line is reeled in the pawl and drag are simultaneously and automatically withdrawn from action.

2. In a fishing-reel, the combination with the spool of a pivoted click-plate, bearing a pawl and its spring and movable edgewise, a drag attached to said plate and movable therewith, a spring for moving said plate and therewith said pawl and said drag into effective position and means for automatically retracting the same; the whole being so organized that both the pawl and the drag simultaneously and automatically resist the withdrawal of the line, yet automatically and simultaneously move out of action and offer practically no resistance when the line is reeled in.

3. In a fishing-reel, a click-plate pivoted near one side and provided with a pawl and its spring, in combination with a drag attached thereto and superimposed thereon; a spring bearing upon said click-plate and tending to move its pawl toward the center of the reel; and a movable finger acting upon said click-plate; the whole so combined that the click and drag may simultaneously be put and retained in action, or withdrawn from action and so retained, at the will of the user.

4. In a fishing-reel, the combination with the spool having a concave frictional surface of a drag movable edgewise on a pivot eccentric to the spool's axis and having a frictional free end, and means for moving said drag into frictional contact with the spool to resist the withdrawal of the line; the organization being such that the drag is automatically retracted to free the spool when the line is reeled in.

5. In a fishing-reel, the combination with the spool having a concave frictional surface of a drag movable edgewise on a pivot eccentric to the spool's axis and having a frictional free end, and a spring for moving said drag into frictional contact with the spool to resist the withdrawal of the line; the organization being such that the drag is automatically retracted to free the spool when the line is reeled in.

Signed at New York, in the county of New York and State of New York, this 23d day of November, A. D. 1901.

JULIUS VOM HOFE.

Witnesses:
WM. O'SHAUGHNESSY,
F. M. DONSBACH.